Dec. 9, 1969    T. C. NICHOLS, JR., ET AL    3,482,443
SOLID INCLUSION, 3-DIMENSIONAL, BOREHOLE STRESSMETER
Filed April 24, 1968                           2 Sheets-Sheet 1

FIG. 1

INVENTORS
THOMAS C. NICHOLS, JR.
FITZHUGH T. LEE
JOHN F. ABEL, JR.

BY
ATTORNEYS

INVENTORS
THOMAS C. NICHOLS, JR.
FITZHUGH T. LEE
JOHN F. ABEL, JR.

BY
ATTORNEYS

United States Patent Office 3,482,443
Patented Dec. 9, 1969

3,482,443
SOLID INCLUSION, 3-DIMENSIONAL, BOREHOLE STRESSMETER
Thomas C. Nichols, Jr., Conifer, Colo., John F. Abel, Jr., Tucson, Ariz., and Fitzhugh T. Lee, Denver, Colo., assignors to the United States of America as represented by the Secretary of the Interior
Filed Apr. 24, 1968, Ser. No. 723,869
Int. Cl. E21b *47/12*
U.S. Cl. 73—151          7 Claims

ABSTRACT OF THE DISCLOSURE

Measurement of 3-dimensional stress in a material mass with instrumentation including an encapsulated spherical probe component for detecting stress change by electrical response, whereon rosettes of strain gages are arranged to be effective in orthogonal planes through the material mass, and emplacement mechanism operable to weld the probe component in such mass. Included as part of the mechanism are a remotely controlled pump injector releasably connected to the probe component, and adapted to deliver between the probe component and the material mass a welding material which sets to rigidly fix the probe component in the material mass while permitting read-out from the strain gage rosettes thereon to an electrically controlled recorder.

---

Figure 2:
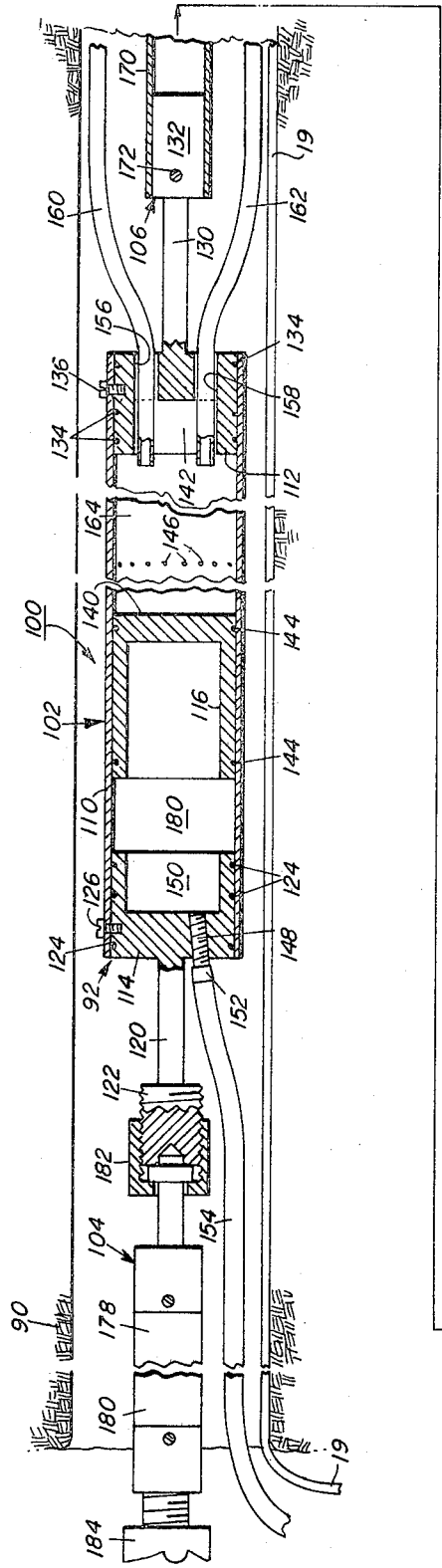
Figure 2:
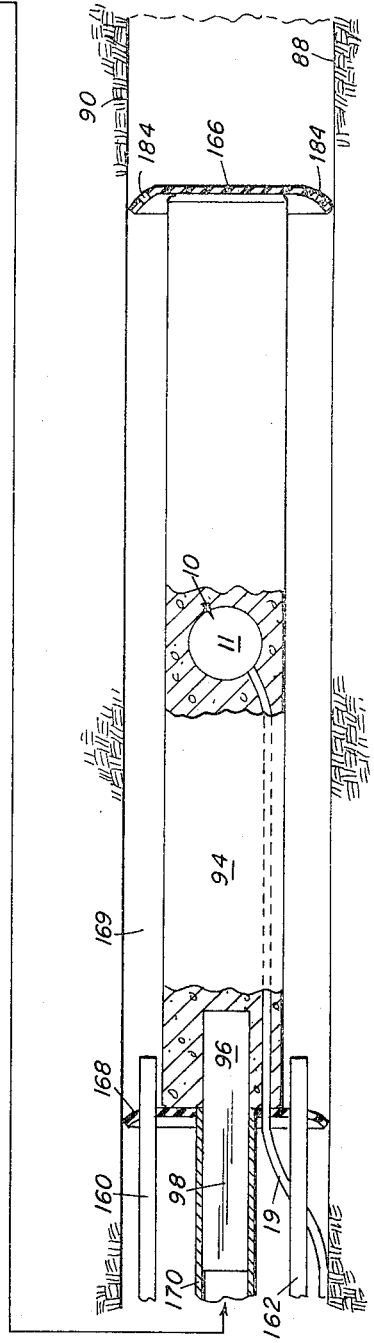

This invention resulted from work by the Geological Survey of the U.S. Department of the Interior, and the domestic title to the invention is in the U.S. Government.

This invention relates to a borehole stressmeter having particular utility in measuring long and short term stress changes affecting geological masses subjected to changing load conditions. More specifically, the invention involves a three-dimensional probe structure, and a mechanism for emplacing this structure as a solid inclusion in the geological mass.

A probe structure having special utility in the present invention includes a special assemblage of strain measuring members affixed to a unitary element. This element is most effective as part of the probe structure when made of rigid and ideally elastic material. A material of high elastic modulus, at least five times greater than that of a host material such as the rock of a geological mass, is desirable to avoid any significant effect on the stress change measurements as a result of changes of the modulus of elasticity in this host material. Moreover, since a cube shaped probe element is likely to be subject to unknown stress distributions located at its edges and corners, and distortions of stresses transmitted across edge boundaries, a sphere shaped probe element is advantageously used in the present invention. When such high modulus sphere is welded by way of an inclusion to the host material, the strain in a given direction at the center of the sphere is equal to the strain measured in the same direction at a point on the surface of the sphere. Thus, strain measuring members appropriately placed on a sphere can measure strain components on orthogonal planes. Accordingly, three such members are used in the invention to measure six components of the stress tensor, including three stresses normal to mutually orthogonal planes and another three stresses in shear acting on the same orthogonal planes. Serving this purpose for the disclosed embodiment of the invention are electrical strain gage arrangements patterned to form rosettes which are disposed symmetrically placed 90 spherical degrees apart on the surface of the aforementioned sphere. This probe structure forms an inclusion within a capsule constituted by bonding material cast about the sphere and the gages thereon from which connective electrical leads extend outside the capsule by passing through a wall thereof. A novel cooperative association between this capsule and an emplacement mechanism according to the present invention facilitates situating the probe structure in a borehole in a known orientation and solidly integrating this structure with the mass of the host material enveloping it.

A primary object of the present invention is to provide an electrically responsive probe for measuring stress changes effecting a material mass containing the probe as an inclusion therein.

A further important object of the invention is to provide a mechanism for incorporating an electrically responsive stress measuring probe in a borehole as an integral part of a material mass defining the borehole.

The manner in which these and other objects of the invention are obtained will become clear from the detailed description which follows and the drawing in which:

FIG. 1 is a generally perspective and partly diagrammatic showing of a probe structure according to the invention, and metering implementation electrically connected thereto; and FIG. 2 is a fragmentary and partly sectional, exploded view of the emplacement mechanism showing it in operative association with an encapsulated probe structure within a borehole.

A probe structure assemblage 10 is seen in FIG. 1 as comprising a ball mount 11 on which three strain measuring sensor member 14, 16 and 18 appear separately disposed on the surface of ball 11 at the intersections of three symmetrically related 90 spherical degree circular arcs. Ball 11 of the preferred embodiment disclosed herein is a one inch diameter chrome alloy steel ball bearing which when prepared as hereinafter explained, would be appropriate for application in a 2½ inch diameter drill hole. Also applicable are other ball materials, such as brass or polycarbonate, which have a lower modulus of elastcity, allowing for greater strain sensitivity as well as for use in softer media, such as fault gouge and soils. Structural homogeneity of ball 11 is checked by etching it in an etching solution. The ball is further cleaned with a solvent to insure a solid bonding action thereon of an epoxy material which is subsequently used to encapsulate probe structure assemblage 10, and grout this structure into a rock mass. Each sensor member includes three rectangular strain gages applied ot sphere 11 with an epoxy adhesive whereby the gages overlap to fashion a rosette. This pattern, as exemplified by the arrangement of strain gages 20, 22, and 24 of sensor member 14, is defined by relating the longitudinal axis of gages 20 and 22, at 45 degree vertical angles, and the longitudinal axis of gages 22 and 24, at 90 degree vertical angles.

The strain gages constituting sensor members 14, 16 and 18, are elongated strips having metal foil grids on their opposite faces, which change electrical resistance with strain and therefore are responsive to compression and tensile stresses, producing electrical resistance changes monitored by the circuitry associated therewith. Separate insulated copper wires respectively connected to the opposite faces of individual strain gages are bound into a cable 19, appearing dispersed in FIG. 1, which extends from probe structure 10 into circuitry 25 of a Wheatstone bridge. Referring again to the circuit diagram of FIG. 1, strain gages 20, 22, and 24 are seen operatively associated with bridge circuitry 25 for controlling a recorder mechanism 26 by way of leads which connect these strain gages to a pair of ganged switch boxes 30 and 32, and a ground lead or return 34 at a base potential common to the gage strips. More specifically, individual lead pairs 36 and 38, 40 and 42, and 44 and 46, which extend from the opposite conductive faces of gages 20, 22, and 24, respectively, are separately attached to different terminals in switch boxes 30 and 32, respectively, so as to separately couple coresponding opposite strain gages with one or the other of the switch boxes. Bridge circuitry 25 includes dummy loads 52 and 54 having leads at one end thereof connected at a juncture 56, and leads at their opposite ends forming juncture 58 and 60 with leads 62 and 64 extending from switch boxes 30 and 32, respectively. The bridge circuitry is completed through leads 68 and 70, extending between juncture 56 and ground point return lead 34, whereby the bridge circuit output is fed to recorder mechanism 26 by way of an amplifier 72. An insulated shaft 74, mounted for rotation in switch boxes 30 and 32 by means of a knob 76, is operable to shift a pair of switch arms 78 and 80, connected to leads 62 and 64, respectively, over contacts at the terminals of the circuits leading to the conductive faces of the strain gages, as hereinbefore described. Thus, these circuits, can be selectively completed to join one or another of the strain gages to bridge circuitry 25, whereby the conductive faces of the gages constitute loads in balancing arms of the bridge. Connections to junctures 58 and 60 from the opposite polarity terminals of a power source 66, facilitates energization of bridge circuitry 25, including the strain gages connected therein, in a manner well understood in the art. Each gage can thereby be made effective in turn to determine the bridge circuitry output, and consequently the indications on recorder mechanism 26.

The construction and arrangement of the strain gage rosettes constituting sensor members 16 and 18, and the read-out circuitry therefor, correspond to that heretofore described for sensor member 14. It is evident that instead of the successive, singular strain gage read-outs permitted by an apparatus as previously disclosed, the read-out of all gages on the probe structure can be accomplished more rapidly by applying a motor drive to sequentially operate the switch boxes linking the strain gages to the bridge circuitry, and simultaneous read-out of the gage measurements can be attained by the use of multiple bridge circuits in an obvious manner.

As will be hereinafter more fully set forth, the mounted arrangement of sensor members heretofore disclosed is disposed in a predetermined manner within a capsule of suitable stress transmitting material. However, embedded strain gage structures employed in other environments have been previously described, as in Patent No. 3,205,-464, issued Sept. 7, 1965, to D. S. Schwartz. Nevertheless, even though the three linear strain sensors of such a structure are oriented in three mutually perpendicular directions, it is limited to measuring only three linear strains, and therefore would be incapable of completely determining changes in the magnitude and orientation of all components of stress or strain in the body within which it is embedded. On the other hand, the present invention is operable to take nine measurements through three strain gages on each of three mutually perpendicular planes. Since the complete definition of changes of stress in magnitude and orientation at a point is determined by measuring changes in six quantities, the three normal and three shear stresses on three planes of known orientation in space, three of the nine measurements taken are redundant, but serve as checks.

An encapsulated probe structure assemblage 10 is represented in FIG. 2 as it would appear positioned in a borehole 88 through a rock mass 90, and readied for an operation of an emplacement mechanism 92 which would weld the probe in place. Probe assemblage 10 is centrally disposed in its capsule 94 by casting the enveloping material into an elongated cylindrical form when the probe is suitably situated with cable 19 drawn therefrom to extend outside the form. In addition, a square cross-section rod 96 is maintained axially aligned with respect to the form and to partially project therein. Rod 96 thus becomes firmly attached to the solidified capsule by its embedded end, and provides the capsule with a connection member 98 by the substantial portion of the rod extending outside the capsule. The mass of capsule cylinder 94 is preferably composed of an epoxy containing a filler such as crushed Carborundum or fused alumina. As hereinbefore indicated, a material such as used in forming the capsule is also applied as the grout with which the capsule is cemented to the boreholde surface.

The epoxy material heretofore described, is particularly suitable as grouting where the borehole contains appreciable moisture, as in a mine roof, because such material has a high resistance to electrical ground, above 200 megohms, and attains the stiffness or rigidity needed to communicate stress changes in host material 90 to probe assemblage 10. A sufficiently low viscosity for the grouting material is also essential since this material is caused to flow into place when applied in a manner to be hereinafter more fully explained. Although smaller particle size for the filler lowers viscosity, it also reduces stiffness. Therefore, optimum grout formulation is determined in accordance with an evaluation of the conditions of emplacement such that a material having high electrical resistance, and requisite flow properties, is also characterized by the maximum stiffness attainable.

Comprising the emplacement mechanism of the present invention, generally designated 100 in FIG. 2, are a pump apparatus 102, and connector contrivances 104 and 106, operatively associated with the apparatus at the opposite ends thereof. Apparatus 102 is an air driven piston-type injector appliance of which a cylindrical sleeve 110, enclosed at its front and back ends by partially hollow plugs 112 and 114, respectively, constitutes a housing for a piston 116. A rod-like extension 120, projecting axially to the rear of plug 114, has an enlarged end portion 122 carrying screw threads. Plug 114 accommodates thereon three O-rings 124 which effect its snug fit within sleeve 110 to which the plug is detachably secured by means such as screw 126. Front end plug 112 is equipped with a similar rod 130 projecting axially and outwardly therefrom. However, the extended end portion 132 of this rod is essentially a rectangular bar having a square cross-section. Three O-rings 134, and fasteners such as screw 136, are also applied to detachably secure plug 112 in sleeve 110 by way of a snug fit therein. Piston 116 is a generally hollow cylinder open at one end, and presenting a driving head 140 which faces a cavity 142 at the inside end of front plug 112. O-rings 144 are also carried on piston 116 to insure an appropriately sealed fit thereof in sleeve 110. Small holes 146 circumferentially arranged about sleeve 110, near the front end thereof, permit release of air compressed ahead of piston 116 during the injection operation hereinafter disclosed. A threaded hole 148 extending through the closure wall of plug 114, and opening into an internal cavity 150 of the plug, has screwed therein a nipple 152 on which is affixed a flexible tubing 154. Holes 156 and 158, through the closure wall of plug 112, provide passages in which are snugly fitted flexible tubes 160 and 162, respectively. Tubes 160 and 162 pass through cavity 142 of plug 112, and expose end openings thereof to a chamber 164 defined in sleeve 110 between the outer face of piston head 140 and the inside surface of plug 112. Extensions of these tubes outside of plug 112, reach capsule 94 where they function in a manner to be hereinafter explained.

The preparation of pump apparatus 102 for use in emplacement mechanism 100 is initiated by unfastening front end plug 112 from the sleeve 110 to effect its removal therefrom whereby chamber 164 is made accessible for filling with an epoxy grout which corresponds to the material used in making capsule 94. A volume of appropriate size is achieved for chamber 164 when the grout is poured upon piston 116 set substantially rearwardly in sleeve 110. Plug 112 is thereafter replaced within the forward end of sleeve 110, and secured, so as to locate the associated open ends of tubes 160 and 162 within the enclosed grout. A disc-shaped packer element 166 is affixed to the leading end of capsule 94, as it appears in FIG. 2, and a similar packer element 168, affixed to the opposite or inner end of the capsule, has a central opening to permit the capsule's connector member 98 to protrude therethrough. These packers can be made of neoprene rubber, or the like, and are formed slightly larger than the borehole opening so as to establish frictionally held closures at the opposite ends of the spatial enclosure 169 defined between the surface of capsule 94 and the surface of the borehole opposite thereto. A coupling provided to join capsule 94 to pump apparatus 102, includes a tube 170 having a suitable square cross-section to accommodate in one end thereof the bar portion 132 of the pump's plug projection 130, whereon the tube is fastened by screw 172, and the other end thereof the capsule's connector member 98, whereon the tube is slidably fitted. When capsule 94 is coupled as indicated, the extended ends of tubes 160 and 162 are pulled through slit perforations in packer 168 so as to properly locate the tubes' end openings within space 169 at such time the invention is made operative in a borehole.

A number of emplacement rods, such as designated 178 and 180, which constitute connector 104, provide a means to advance pump apparatus 102, along with the encapsulated probe, a proper distance into the borehole. Wedge and screw coupling devices such as designated 182 and 184, utilized to form the string of rods, permit these rods to be individually attached as emplacement mechanism 100 is moved through borehole 88, as well as to maintain a proper orientation of the probe being advanced thereby. Packers 166 and 168 lend rigidity to the advancing structural combination, and additionally serve to center the capsule in borehole 88. After the probe is situated at a requisite distance into the borehole, an air pump (not shown) to the outlet of which is attached tube 154, is activated to supply compressed air via nipple 148 to an expansible chamber 180, including cavity 150 and the hollow in piston 116. Responding to the pressure applied thereto, piston 116 is forwardly displaced whereby epoxy mixture filling chamber 164 is forced by piston face 140 to pass through tubes 160 and 162, to be deposited in space 169 between rock mass 90 and capsule 94. Packers 166 and 168 have a multiplicity of perforations 184 which permit air in space 169 to escape, and are small enough to prevent the viscous epoxy mixture from leaking. When the supply of epoxy in chamber 164 is extruded, piston 116 is located ahead of holes 146 in the chamber wall whereby air pressure drops immediately to indicate completion of the injection operation. Air holes 146 are also small enough to prevent the viscous epoxy mixture from leaking. Sufficient epoxy has then been transferred to completely fill space 169. Rapid withdrawal of emplacement mechanism 100 immediately thereafter slides tube 170 over projection 98 to open the connection thereat, and dislodges tubes 160 and 162 from packer 168, so as to fully separate the mechanism from capsule 94. With the emplacement mechanism removed, setting of the epoxy proceeds and readings from probe assemblage 10 are taken by way of the electrical connections in cable 19 extending between capsule 94 and the bridge circuitry and recorder outside borehole 88. Monitoring of the probe is continued from two to five days until the readings have become stabilized at which time the epoxy mixture has completely set and effectively welded capsule 94 and probe assemblage 10 therewith, to the walls of borehole 88.

Stainless steel materials can be used for the cylinder and piston components of the invention, and vinyl plastic can be used for the tubing carrying epoxy out of the pump as well as the tubing supplying compressed air thereto. Aluminum materials serve satisfactorily for the various connector parts associated with the pump. Other forms of strain-sensing elements or transducers are applicable in the invention whereby it can provide a means for measuring stress changes having a frequency range that need only to be compatible with the frequency response range of the particular probe elements employed. Therefore, while the preferred embodiment of the invention has been described and illustrated, it is to be understood that the invention is not limited thereby but is susceptible to changes in form and detail.

What is claimed is:

1. In a borehole pressure detecting and recording arrangement having a pressure reading recording means operationally responsive to a recorder operating means, the improvement comprising a pressure sensing probe mechanism, said mechanism including as integral parts thereof a capsule enveloping a probe sensor assemblage and means affixed within one end of said capsule and projecting outwardly therefrom, means operable to emplace said capsule within a predetermined part of a borehole, said emplacing means including a pump apparatus, separate means constituting respective end closures for said pump apparatus, and each said closure having a portion thereof extending outwardly from said apparatus, a first connector means attached to one of said closure extensions and slidably mounted on said capsule projection, means to advance said probe mechanism toward a predetermined part of said borehole, a second connector means attaching said advancing means to said other closure extension, said pump apparatus having a chamber for holding a dispensable supply of fluid cementing material, individual packer elements separately affixed to said one end of said capsule and to an opposite end thereof, conduit means having ends thereof opening into said chamber and other ends therof extending into a space around said capsule existing between said packer elements in contact with the surface of said borehole when said probe mechanism is advanced to said predetermined part of said borehole whereat said conduit means provides a channel wherein said fluid material is transferred from said pump chamber to said space to cement said capsule within said borehole.

2. In the arrangement of claim 1, said capsule comprising an elongated cylindrical mass of material corresponding to said cementing material wherein said sensor assemblage is centrally situated and a communicating means extends from said sensor assemblage through said cement mass and outside one wall thereof for connection to said recorder operating means.

3. In the arrangement of claim 2, the fluid cementing material being a mixture of epoxy and a filler.

4. In the arrangement of claim 1, said pump apparatus comprising an elongated cylinder, said end closures of said pump apparatus being fitted with compressed seals into respective end openings of said cylinder, a piston fitted with compressed seals for slidable displacement within said cylinder between said end closures thereof, a tubing coupled to a passage through said other end closure, air pressure means connected to said tubing to supply said cylinder by way of said passage with compressed air acting to advance said piston into said chamber holding said supply of fluid cementing material, and said cylinder having a multiplicity of holes through a wall thereof and opening into said chamber, said holes permitting a pressure drop in said air in said cylinder when said piston is fully advanced therein whereby completion of said transfer of said fluid material from said chamber to said space, is indicated.

5. In the arrangement of claim 1, said means to advance said probe mechanism comprises a plurality of elongated emplacement rods constituting a string thereof, and composite coupling means having separable parts thereof at the end of each rod so as to enable successive keying connections between individual ones of said rods to form said string as said probe mechanism is advanced in said borehole by the application of force to said string.

6. In the arrangement of claim 1, said probe sensor assemblage comprising a spherical support element having a plurality of strain responsive electrical sensor members cemented on the surface of said spherical support, and a cable of conductive wires extending from connections thereof with said sensor members and out through one wall of said capsule to constitute a means for communicating between said probe sensor assemblage and said recorder operating means.

7. In a pressure detecting and recording arrangement to indicate 3-dimensional stress changes in a material mass, having means to record pressure readings operationally responsive to a recorder operating means, an improvement thereof comprising a pressure sensing probe mechanism including a capsule of elastic material, said capsule enveloping a probe sensor assemblage having a wholly solid spherical support element of elastic material, said support element having cemented on the outer surface thereof three sensor members located equidistant from one another, separated by circular arcs of 90 spherical degrees, each said sensor member constituted by at least three elongated strain gages set upon each other to form a rosette pattern, separated electrical conductors respectively connecting each of said strain gages and extending out through one wall of said capsule to constitute a means for communicating between said probe sensor assemblage and said recorder operating means when said capsule of said pressure sensing probe mechanism is welded to said material mass and operational.

References Cited

UNITED STATES PATENTS

| | | | |
|---|---|---|---|
| 3,286,513 | 11/1966 | Wasiutynski | 73—88.5 |
| 2,109,745 | 3/1938 | Hayward | 73—151 |
| 2,599,578 | 6/1952 | Obert et al. | 73—88.5 |
| 3,139,931 | 7/1964 | Simpson et al. | 166—21 |
| 3,208,525 | 9/1965 | Caldwell et al. | 166—33 |

FOREIGN PATENTS

| | | |
|---|---|---|
| 49,357 | 4/1965 | Poland. |

OTHER REFERENCES

The Strain Gage Primer, Perry and Lioner (N.Y., McGraw-Hill, 1955), Figs. 5-27.

JERRY W. MYRACLE, Primary Examiner

U.S. Cl. X.R.

73—88.5